Oct. 13, 1942.　　J. MASON ET AL　　2,298,955
AUTOMATIC FEEDING DEVICE
Filed Nov. 14, 1940　　3 Sheets-Sheet 1

INVENTOR.
JOSEPH MASON
AND CYRIL O. BENSON
BY
Moses and Nolte
ATTORNEYS

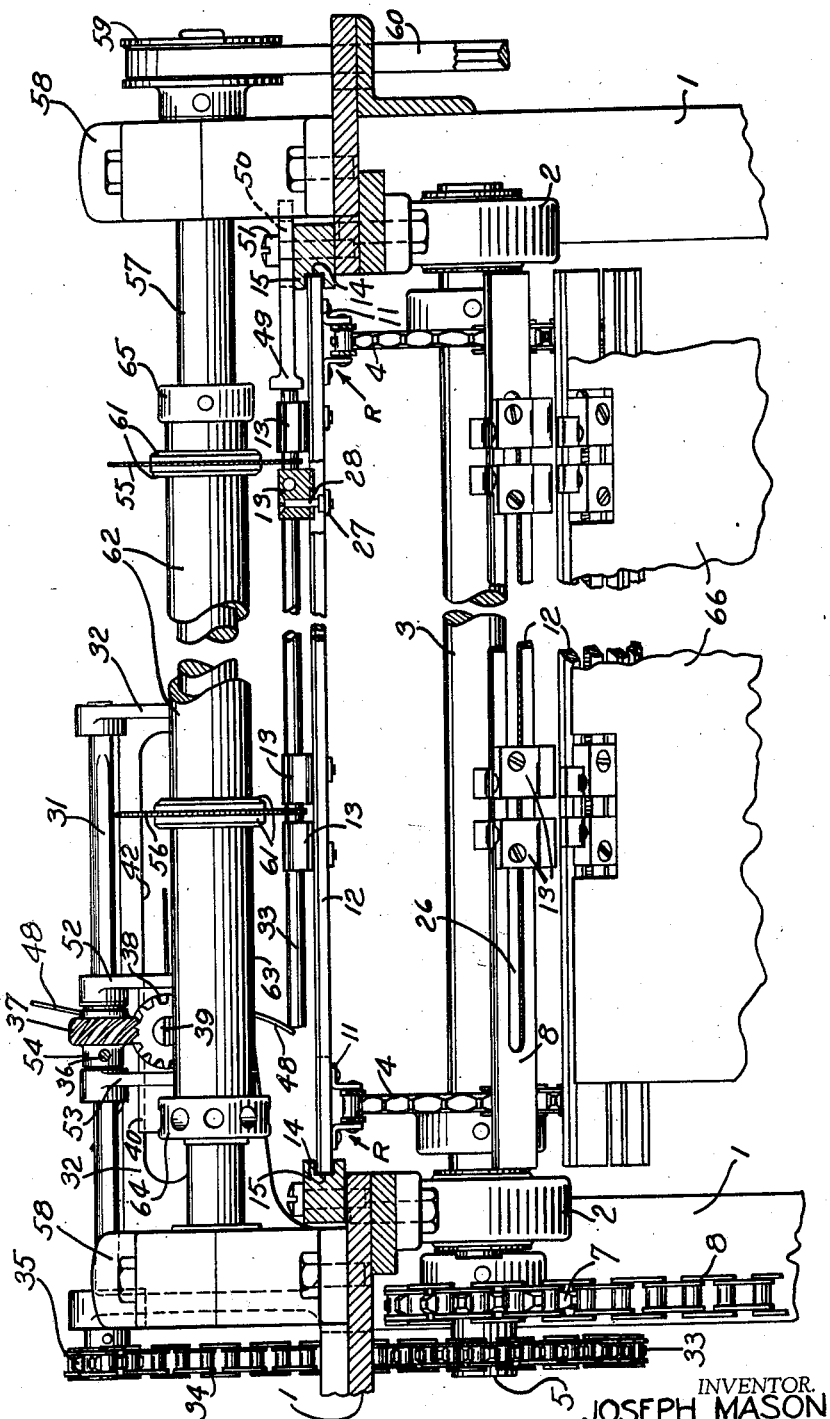

Oct. 13, 1942.    J. MASON ET AL    2,298,955
AUTOMATIC FEEDING DEVICE
Filed Nov. 14, 1940    3 Sheets—Sheet 3
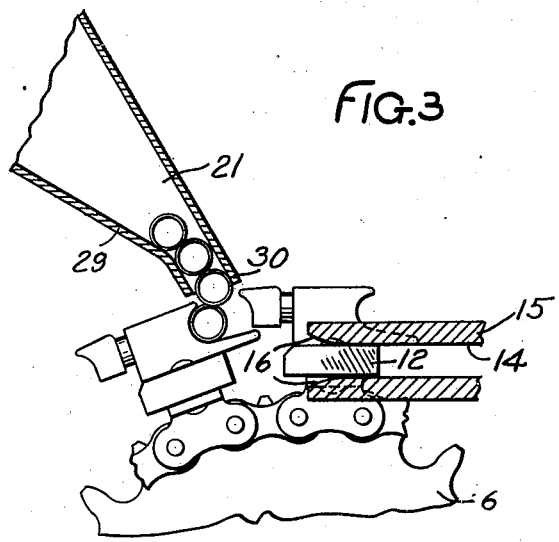
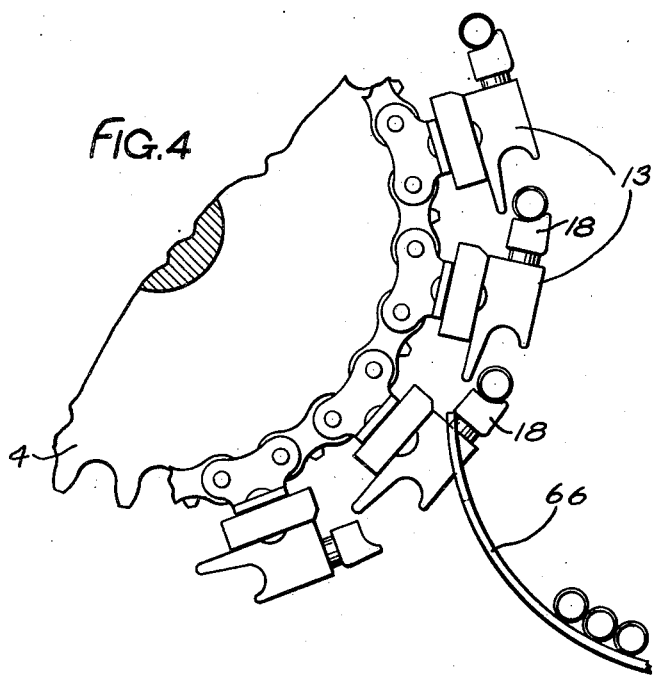
INVENTOR.
JOSEPH MASON
AND CYRIL O. BENSON
BY
ATTORNEYS Patented Oct. 13, 1942

2,298,955

UNITED STATES PATENT OFFICE 2,298,955

AUTOMATIC FEEDING DEVICE

Joseph Mason, Providence, R. I., and Cyril O. Benson, Brooklyn, N. Y., assignors, by mesne assignments, to United Aircraft Products, Inc., Dayton, Ohio, a corporation of Ohio Application November 14, 1940, Serial No. 365,586

16 Claims. (Cl. 29—70)

This invention relates to a device for the automatic feeding and conveying of articles from a bulk supply in a controlled and uniform stream to a station where a finishing operation is performed on the articles as they are individually presented.

It is an object of the invention to provide a feeding or conveying device which will effect the withdrawal of the articles individually from a hopper which holds an unassorted supply of the articles and will convey the articles to a station at which a finishing operation is performed on them.

It often happens that the articles are not uniform in length as they are supplied to the hopper. In such case, it is a further object of the invention to provide, in association with the means which conveys the articles to the finishing station, a positioning means for bringing the articles into alignment with each other and the conveyor so that they are uniformly presented to the tool or tools at the finishing station.

Where the operation to be performed on the articles at the finishing station would tend to rotate them or otherwise cause them to be displaced on the conveyor, it is another object of the invention to provide means whereby the articles are securely held after they have been properly positioned on the conveyor and while they are being fed against the tool or tools which effect the finishing operation.

After the finishing operation has been performed on the articles, it is a still further object of the invention to provide a simple and efficient means for removing them from the conveyor and guiding them to another machine where a further operation is to be performed on them or into a suitable container wherein a supply of the articles may be accumulated and stored.

Additional objects of the invention will become apparent to those skilled in the art as the description thereof proceeds. For a better understanding of the invention, reference is made to the accompanying drawings in which:

Fig. 2 is a fragmentary side elevation of the machine shown in Fig. 1 taken from the right, certain parts being broken away and others shown in section; and Figs. 3 and 4 are fragmentary side elevations showing portions of the conveying device in more detail.

Figure 1:
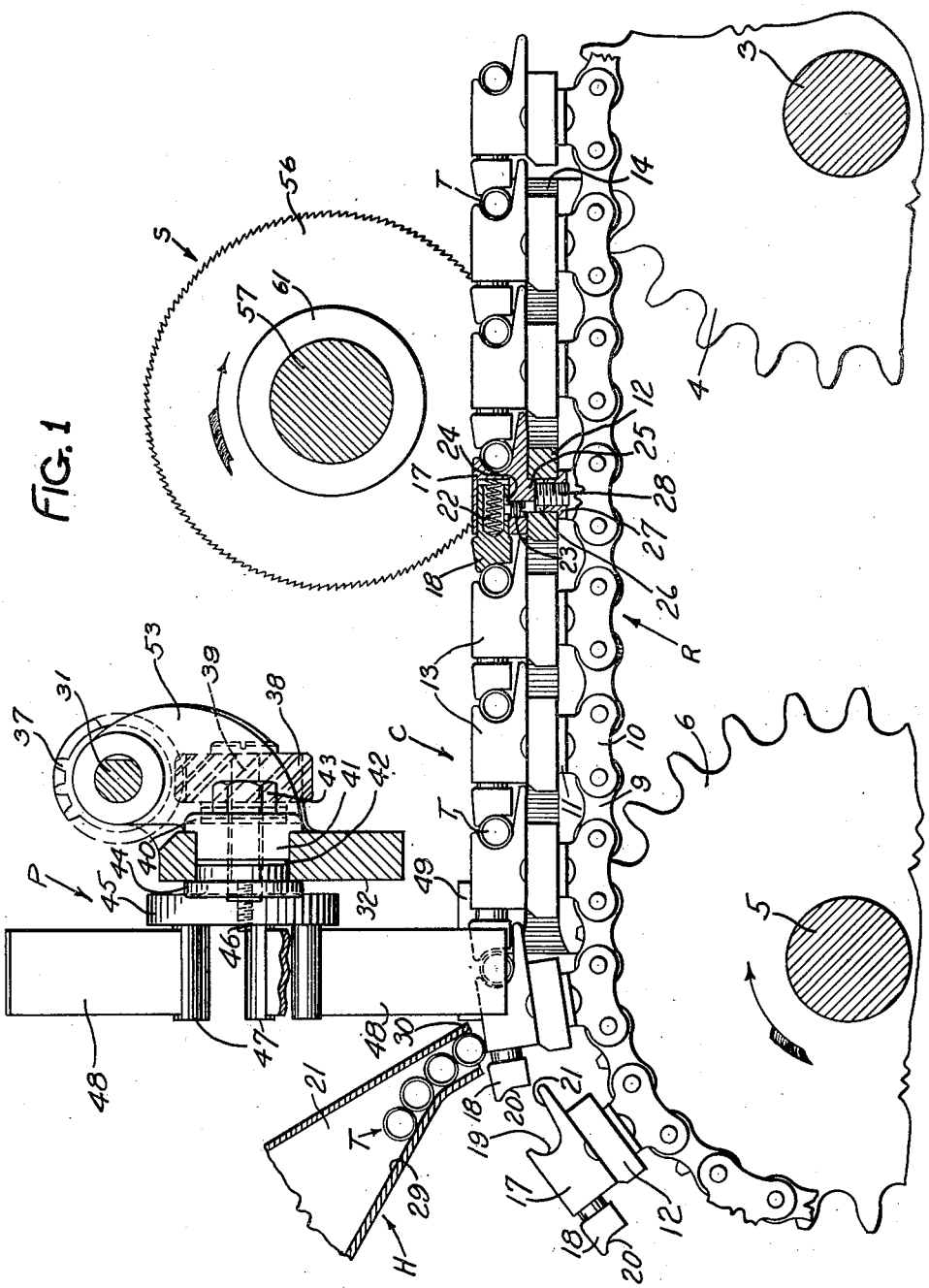
Fig. 1 is an end view, partly in section, of a machine for conveying and cutting metal tubing embodying the invention, with certain parts omitted.

The invention is shown in connection with a machine for cutting hollow metallic tubing into predetermined lengths, a quantity of the tubes T being disposed in a hopper device H and being advanced individually to a plurality of finishing or cutting devices S by means of a conveying device C. The conveying device comprises a main frame 1 which supports a pair of pillow blocks 2 in which is journaled a shaft 3 carrying the sprocket wheels 4, the teeth of which are in alignment. Also journaled for rotation in the frame 1 is a shaft 5 which is parallel to the shaft 3 and carries a pair of sprocket wheels 6. For the purpose of rotating the sprocket wheels 6 the shaft 5 is provided near its left hand end, as seen in Fig. 2, with the driving sprocket 7 which is driven by a sprocket chain 8 having driving connection with any suitable source of power, not shown. Meshing with the teeth of the sprockets 4 and 6 is a pair of endless roller chains R composed of the alternate normal links 9 and the special links 10, the latter being bent over to provide the projecting lugs 11. To the aligned lugs 11 of the two chains R are secured the transversely extending bars 12 to which are adjustably secured in a manner to be described a plurality of clamping devices 13 as shown in Fig. 2. The ends of the bars 12 are received in the slots 14 provided in a pair of guides 15 mounted on the frame member 1. As shown in Fig. 3, the ends of the guides 15 are flared outwardly as indicated at 16 at the region where the bars 12 enter the guides to insure that the bars will enter smoothly. The length of the guide bars 15 is such that the clamp supporting bars 12 are entirely free of them while the bars are rotating about the sprockets 4 and 6.

Each clamping device 13 comprises a clamp 17 which is secured to the bar 12 and a clamping jaw 18 which is slidable within a bore provided in the clamp 17. The clamping surface of the clamp 17 is curved as indicated at 19 and the clamping surface of the jaw 18 curved as indicated at 20, the curvature of these surfaces corresponding to the peripheral surface of the articles T to be finished. The lower end of the clamp 17 extends forwardly of the curved surface 19 to provide a forwardly extending toe 21 for a purpose to be later described. The clamping jaw 18 is biased away from the clamp 17 by means of a spring 22, and is prevented from separating from the clamp 17 by means of a set screw 23 which enters into a short slot 24 provided in the clamp member 18, the set screw 23 also serving to prevent rotation of the clamp 18 with reference to the clamp 17. The clamp 17 has a projecting lug 25 which fits into a slot 26 formed in the bars 12 and is retained in position by means of a T nut 27 which is threaded onto a screw 28 carried by the clamp 17. This arrangement permits the clamps 13 to be adjusted lengthwise of the slots 26 and to be retained at any desired adjusted positions on the clamp supporting bars 12. While in the arrangement shown, four clamping devices 13 are provided to clamp the tubes T along the length thereof, it is to be understood that a smaller or larger number of clamping devices may be used.

In Figs. 1 and 3 it will be observed that the clamping surfaces 19 and 20 separate while the clamps 17 are passing around the sprockets 4 and 6 and approach each other as the links which carry them pass the sprockets and start on the horizontal line of travel therebetween.

The hopper H is provided with an inclined bottom 29 down which the tubes T pass to a narrow mouth 30 which is adapted to deposit the tubes one at a time on top of the clamps. As shown in Figs. 1 and 3, the mouth 30 is disposed somewhat to the left of a vertical plane passing through the axis of shaft 5 so as to deposit the tubes between the clamping surfaces 19 and 20 while they are still separated by a distance greater than the diameter of the tubes, the toe 21 preventing the tube from dropping through the space between the clamps 19 and 20 and out of engagement therewith.

When power is applied to the chain 8, the sprocket wheel 7 and shaft 5 will be rotated in a clockwise direction as shown in Fig. 1, causing the rotation of the sprockets 6 which in turn through the roller chains described causes the sprockets 4 to be rotated in the same direction. After a tube is received between the clamps 17 and 18, the upper surface of next succeeding clamps as they are advanced along under the mouth 30 of the hopper will prevent the next succeeding tube from leaving the hopper until the opening between the next succeeding clamps is reached.

As the tubes T are advanced away from the hopper and before the clamping jaws 19 and 20 have firmly engaged the tubes, they are brought into alignment with each other by means of a positioning device P. This positioning device is adjustable transversely of the conveyor so that tubes of different lengths may be finished in the machine. The positioning device comprises a shaft 31 which is rotatably supported in a bracket 32 carried by the main frame 1, the shaft 31 being rotated at a speed five times greater than that of the shaft 5 by means of a sprocket 33 secured to the latter shaft, a sprocket chain 34 and a sprocket 35 connected to the shaft 31. Secured to the shaft 31 by means of a set screw 36 is a spiral gear 37 which drives a similar gear 38 secured upon a shaft 39 which is rotatably supported in a bracket 40. The bracket 40 is provided with a projecting lug 41 which extends into an elongated slot 42 provided in the bracket 32 and is secured in position thereon by means of a bolt 43 which extends through the bracket 40, a T nut 44 engaging the bolt 43 and being adapted to clamp the bracket in any desired position along the slot 42. The shaft 39 drives a disc 45 which is secured to the rear end of said shaft by means of a threaded end portion 46, the disc being provided with five symmetrically disposed projecting pins 47, each of which has secured thereto a spring blade 48.

Through the chain drive and gearing described, each spring blade 48 is caused to engage the left hand end of a tube T just after the tube has been deposited on the conveyor. This contact with the tube is made before the clamping surfaces 19—20 close upon it and consequently the tube is moved to the right until it engages a limit stop bar 49 which extends for a substantial distance parallel to the conveyor chains. To provide for adjustment in order to accommodate different lengths of tubes, the stop bar 49 is provided with a slot 50 and is secured to the frame 1 by means of a screw 51 passing through the slot 50. Each spring blade 48 is wide enough to remain in contact with the end of a tube T as the opposite end thereof passes along the stop 49 and until the clamp jaws 19 and 20 are firmly closed upon the tube whereupon the blade 48 flexes and passes upward until it is clear of the tube.

The bracket 40 is provided with a pair of upstanding arms 52—53 which are bored to slidably embrace the shaft 31 and engage the opposite ends of the hub 54 of gear 37. It will be apparent that upon the loosening of the nut 44 and the set screw 36, the bracket 40 may be adjusted along the slot 42 and the spiral gear 37 along the shaft 31 to adjust the spring blades 48 into different positions transversely of the conveyor chains in order to accommodate tubes of different lengths.

In the illustrated embodiment of the invention the tubes, after they are firmly gripped by the clamping jaws 19 and 20, are advanced by the conveyor chains against a pair of rotary saw blades 55—56 mounted between the conveyor chains on a shaft 57 at the finishing station S. The shaft 57 is mounted in a pair of pillow blocks 58 attached to the frame 1 and is rotated in a clockwise direction, as indicated by the arrow in Fig. 1, by means of a drive pulley 59 which is driven from a suitable drive pulley (not shown) by means of a V shaped belt 60. The saw blades 55—56 are locked on the shaft 57 in a known manner by means of the washers 61, spacing collars 62—63 and a lock nut 64 which engages a threaded portion of shaft 57 and compresses the entire assemblage to the right against a collar 65 fast on the shaft 57.

The spacing between the saw blades 55 and 56 is adjusted so that a tube of the desired length is cut from the center portion of each tube T. While the articles finished have been indicated as tubes, it will be understood that the machine is adapted to cut solid rods or bars of metal or other material which it is desired to cut into uniform lengths. Also while the tubes have been indicated as having a circular cross section, it will be understood that the machine is adapted for the cutting of articles of hexagonal, octagonal or other non-circular cross sections. Also while the invention has been illustrated in connection with a severing operation on the articles at the finishing station S, it will be understood that it is also adapted for use in connection with a milling, grinding, polishing or other machine operation.

After the tube has been severed and shortly after the clamp supporting bar 12 leaves the slots 14 in the guide bars 15, the links supporting the bar start to pass over the sprockets 4. This causes the clamping surfaces 19—20 of adjacent clamps to separate until the tube is again free. As the finished tubes resting on the clamps 18 pass down over the sprockets 4, they may be allowed to drop off under the action of gravity into a storage container. It is preferred, however, to provide a curved wiper 66 which engages the tubes and positively removes them from the clamps as shown in Fig. 4. The wiper 66 may conduct the tubes to a storage container in which they may be stored or may conduct them to the input end of another machine in which a further operation or operations on the tubes are made.

We have described what we believe to be the best embodiments of our invention. We do not wish, however, to be confined to the embodiments shown, but what we desire to cover by Letters Patent is set forth in the appended claims.

We claim:

1. A feeding apparatus comprising a conveyor including parallel chains passing over coaxial sprockets at opposite ends of a run extending past a work station, a series of spaced transversely extending clamp supports each mounted on a pair of transversely registering links of said chains, a plurality of clamps mounted on the clamp supports intermediate the chains, each clamp including a jaw mounted on one support and a cooperating jaw mounted on a contiguous support, arranged to open the jaws during passage of the chains around each sprocket, and to close the jaws during the travel of the chains between the sprockets, and a feed device for supplying articles successively to transversely aligned sets of clamps during passage of the chains around the sprockets in advance of the work station.

2. A feeding apparatus comprising a conveyor traveling past a work station, article clamping members mounted in series on the conveyor, a supply device for supplying articles successively to the clamping members, a clamp control device arranged to open the clamps in advance of the supply device, close the clamps between the supply device and the work station, and open the clamps after passing the work station; an article aligning device including a stop extending along one side of the article path between the supply device and the work station, and a member moving transversely of the conveyor into engagement with an end of an article between the supply device and the point of clamp closing arranged to shift the opposite end of the article into aligning engagement with the stop.

3. A feeding apparatus comprising a conveyor, a series of article supports on the conveyor, and an article aligning construction including a stop extending along one side of the article path in register with contiguous ends of articles on the conveyor, and a device engaging the opposite ends of the articles arranged to move them into aligning engagement with the stop, the device including a plurality of yielding article engaging elements, a support for the elements rotating about an axis extending lengthwise of the conveyor, a drive shaft extending transversely to the conveyor, and drive gearing connecting the drive shaft and the support and longitudinally slidable on the drive shaft for adjusting the position of the yielding elements transversely to the conveyor.

4. A feeding apparatus for elongated articles comprising a flexible conveyor traveling past a work station and provided with a series of spaced transverse supports, a plurality of article gripping clamps mounted on each support, a feeding device for supplying articles successively to the clamps, each clamp including a pair of cooperating jaws carried respectively by adjacent supports, and a rotary member around which the conveyor passes located in advance of the feeding device and beyond the work station whereby to effect operation of the clamps by movement of the supports in passing around the rotary member to grip the articles prior to the latter reaching the work station and to open the clamps and thereby release the articles after passing the work station.

5. A feeding apparatus for elongated articles comprising a flexible conveyor traveling past a work station and provided with a series of spaced transverse supports, a plurality of clamps mounted on each support, a feeding device for supplying articles successively to the clamps, clamp operating means disposed to close the clamps to grip the articles in advance of the work station and to open the clamps to release the articles after passing the work station, and means to adjust the clamps lengthwise of the transverse supports.

6. A feeding apparatus for elongated articles comprising a flexible conveyor traveling past a work station and provided with a series of spaced transverse supports, a plurality of clamps mounted on each support, a feeding device for supplying articles successively to the clamps, clamp operating means disposed to close the clamps to grip the articles in advance of the work station and to open the clamps to release the articles after passing the work station, a device adjustable transversely of the conveyor for operating on the articles on the conveyor at the work station, and means to adjust the clamps transversely of the conveyor into registry with the device for operating on the articles.

7. A feeding apparatus comprising a conveyor traveling past a work station, article clamping members mounted in series on the conveyor, a supply device for supplying articles successively to the clamping members, a clamp control device arranged to open the clamps in advance of the supply device, close the clamps between the supply device and the work station, and open the clamps after passing the work station, an article aligning device including a stop extending along one side of the article path between the supply device and the work station, and a member movable transversely of the conveyor and having engagement with one end of an article at points between the supply device and the point of closing of the clamps to move the opposite end of the article into engagement with the stop whereby the member maintains its engagement with said first named end of the article until the article is gripped by the clamping members.

8. A feeding apparatus comprising a conveyor traveling past a work station, article clamping members mounted in series on the conveyor, a supply device for supplying articles successively to the clamping members, a clamp control device arranged to open the clamps in advance of the supply device, close the clamps between the supply device and the work station, and open the clamps after passing the work station; an article aligning device including a stop extending along one side of the article path between the supply device and the work station, and a yieldable member movable transversely of the conveyor into engagement with an end of an article between the supply device and the point of clamp closing arranged to shift the opposite end of the article into aligning engagement with the stop.

9. A feeding apparatus comprising a conveyor traveling past a work station, article clamping members mounted in series on the conveyor, a supply device for supplying articles successively to the clamping members, a clamp control device arranged to open the clamps in advance of the supply device, close the clamps between the supply device and the work station, and open the clamps after passing the work station; an article aligning device including a stop extending along one side of the article path between the supply device and the work station, and a member movable transversely of the conveyor and which includes a spring blade engaging one end of the article to move the opposite end thereof into engagement with the stop at points between the supply device and the point of closing of the clamps.

10. A feeding apparatus comprising a conveyor traveling past a work station, article clamping members mounted in series on the conveyor, a supply device for supplying articles successively to the clamping members, a clamp control device arranged to open the clamps in advance of the supply device, close the clamps between the supply device and the work station, and open the clamps after passing the work station; an article aligning device including a stop extending along one side of the article path between the supply device and the work station, and means movable transversely of the conveyor and including a rotary unit located adjacent the path of travel of the articles and having a series of radially extending elements for engaging corresponding ends of successive articles.

11. A feeding apparatus including a conveyor, a series of article receiving members mounted on the conveyor, article alining means including a stop engageable with one end of the articles, and rotary yieldable means movable transversely of the path of movement of the conveyor and engageable with the opposite ends of the articles to move and hold said opposite ends in engagement with the stop.

12. A feeding apparatus including a conveyor, a series of article receiving members mounted on the conveyor, article alining means including a stop engageable with one end of the articles, and rotary means having a plurality of yieldable members movable transversely of the conveyor and successively engageable with the opposite ends of the articles to move same into engagement with the stop.

13. A feeding apparatus including a conveyor, a series of article receiving members mounted on the conveyor, article alining means including a stop engageable with one end of the articles, rotary means engageable with the opposite ends of the articles to move same into engagement with the stop, a drive member extending transversely of the conveyor, and a drive connection between the drive member and the rotary means movable longitudinally of the drive member to adjust the position of the rotary means relative to the conveyor.

14. In an article feeding device, a conveyor, article gripping clamps carried by the conveyor for receiving and subsequently gripping the articles, means to aline the articles on the conveyor including stop means for engagement with a part of the articles, means rotatable transversely of the conveyor and provided with elements engageable with an opposite part of the articles to move same into engagement with the stop means; means to rotate the rotatable means, and means to effect opening of the clamps to receive the articles prior to the closing thereof to grip the articles.

15. In an article feeding device, a conveyor, article gripping clamps carried by the conveyor for receiving and subsequently gripping the articles, means to aline the articles on the conveyor including stop means for engagement with a part of the articles, rotary means provided with blades engageable with an opposite part of the articles to move same into engagement with the stop means, and being of a width to maintain engagement with the articles until the clamps are in gripping engagement with the articles, means to actuate the rotary means in a plane transverse to the conveyor to cause the blade to successively engage the articles, and means to open the clamps prior to closing thereof to grip the articles.

16. In an article feeding device, a conveyor, article gripping clamps carried by the conveyor for receiving and subsequently gripping the articles, means to aline the articles on the conveyor including stop means for engagement with a part of the articles, rotary means provided with spring blades engageable with an opposite part of the articles to move same into engagement with the stop means, and being of a width to maintain engagement with the articles until the clamps are in gripping engagement with the articles, and means to operate the rotary means and thereby the blades in a plane at substantially right angles to the plane in which the articles are presented to the clamps.

JOSEPH MASON.
CYRIL O. BENSON.